United States Patent [19]
English

[11] Patent Number: 5,795,420
[45] Date of Patent: Aug. 18, 1998

[54] METHOD OF APPLYING A FINISHING SHEET TO A SUBSTRATE

[75] Inventor: Everett W. English, Clarksburg, Calif.

[73] Assignee: Wintune Graphics, Inc., Sacramento, Calif.

[21] Appl. No.: 660,688

[22] Filed: May 31, 1996

[30] Foreign Application Priority Data

Jul. 25, 1995 [IT] Italy ................. MI95A1616

[51] Int. Cl.$^6$ ............. B32B 31/18; B32B 31/20; B32B 31/26; B32B 31/28

[52] U.S. Cl. ............. 156/64; 156/212; 156/229; 156/267; 156/272.2; 156/275.5; 156/277; 156/280; 156/285; 156/328; 427/258; 427/285; 427/558

[58] Field of Search ............. 156/212, 267, 156/277, 278, 285, 328, 229, 272.2, 275.5, 280, 289, 322, 64; 427/558, 258, 282; 40/626, 628, 630, 638

[56] References Cited

U.S. PATENT DOCUMENTS

| | | | |
|---|---|---|---|
| 3,751,319 | 8/1973 | Green et al. | 156/277 |
| 4,136,224 | 1/1979 | Minami et al. | 428/161 |
| 4,273,816 | 6/1981 | Tollette | 156/277 |
| 4,838,973 | 6/1989 | Mentzer | 156/212 |
| 5,227,240 | 7/1993 | Tilley et al. | 428/412 |
| 5,305,538 | 4/1994 | Kanzelberger | 156/63 |
| 5,413,840 | 5/1995 | Mizuno | 428/195 |

*Primary Examiner*—Richard Crispino
*Attorney, Agent, or Firm*—Welsh & Katz, Ltd.

[57] ABSTRACT

A method of applying a finishing sheet to a substrate, such as a body part of a scooter or motorcycle which includes the steps of printing a graphic design on that side of a transparent finishing sheet which is to face towards the substrate on which it is applied and applying a film adhesive to the side of the sheet on which the graphic design is printed. The method also includes applying the finishing sheet to the substrate by thermo-vacuum forming; during this forming, the sheet is heated to soften the sheet, to melt the adhesive and to rewet the ink used to print the graphic. The thermoformed finishing sheet is trimmed along the perimeter of the substrate.

25 Claims, 2 Drawing Sheets

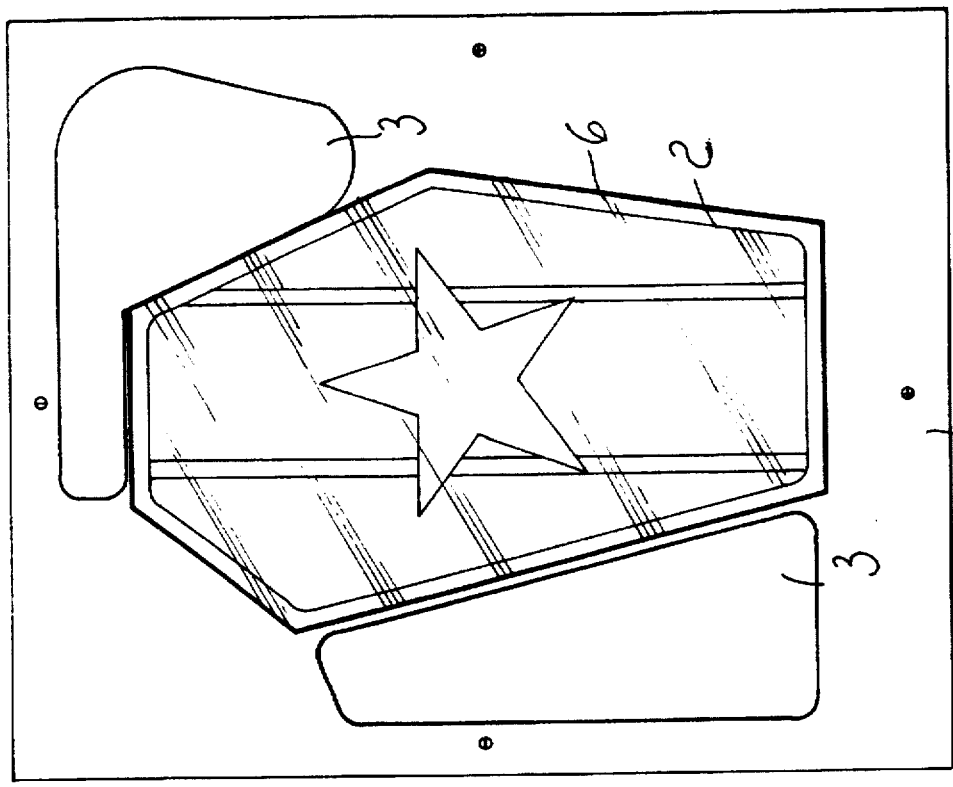
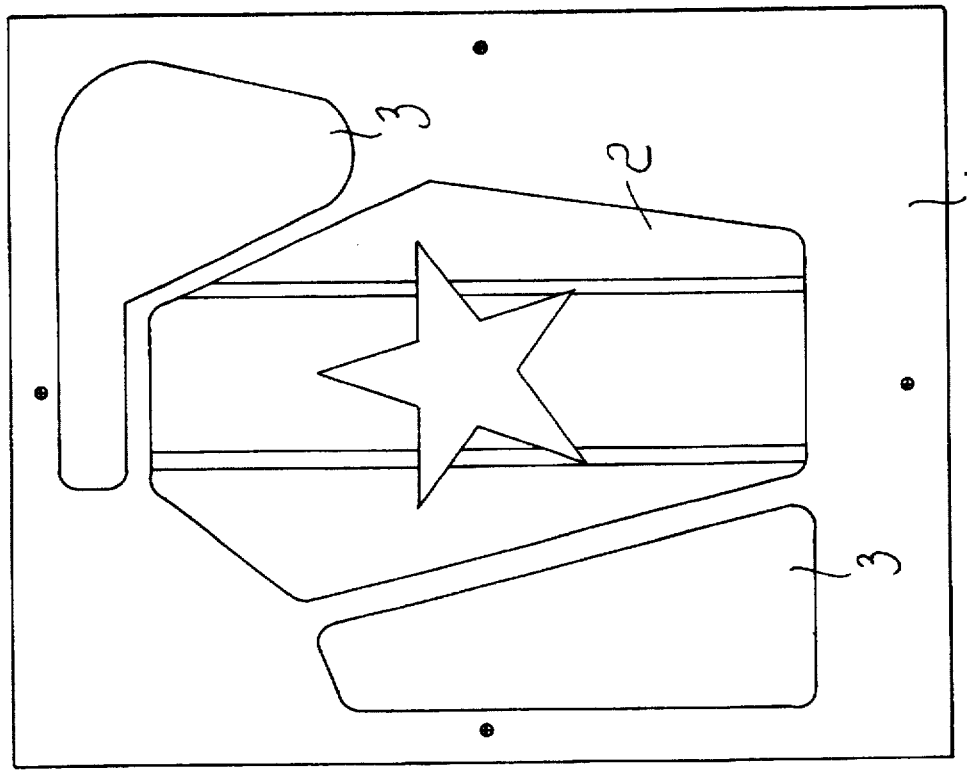

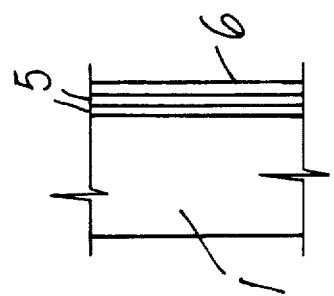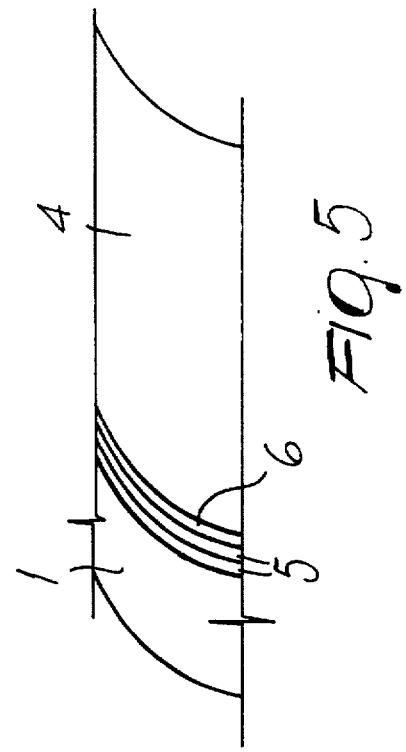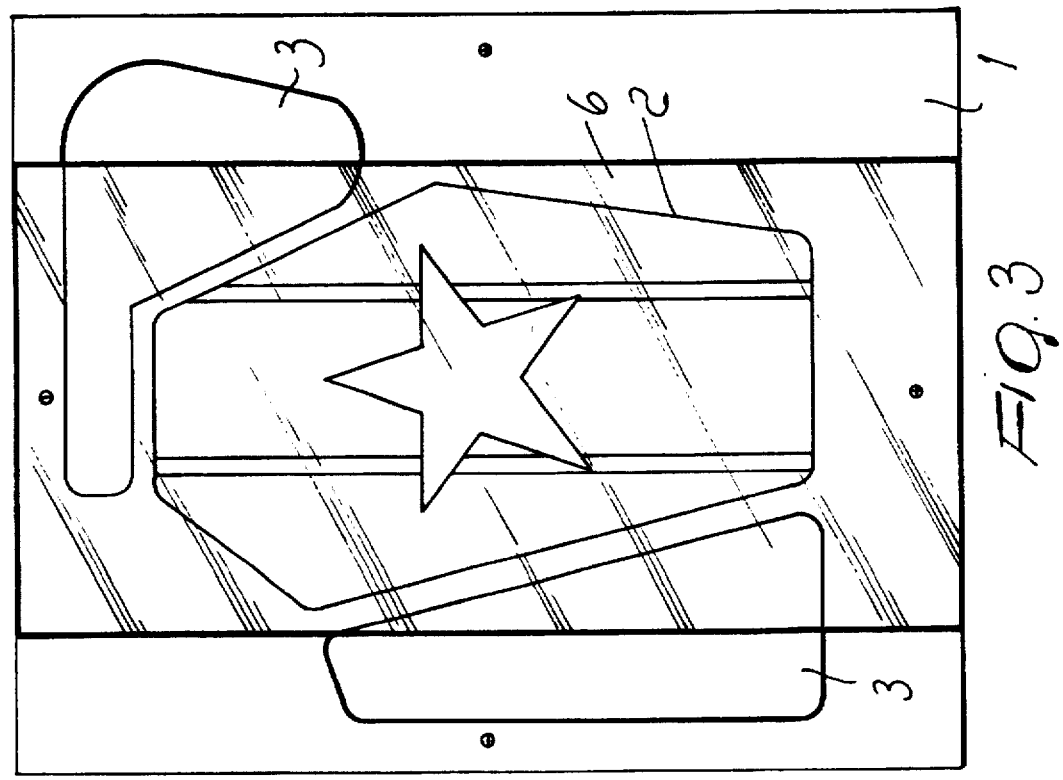

METHOD OF APPLYING A FINISHING SHEET TO A SUBSTRATE

BACKGROUND OF THE INVENTION

The present invention relates to a method of applying a finishing sheet to a substrate, particularly for body parts of scooters, motorcycles and the like.

Several methods are known for applying finishing sheets to substrates such as for example helmets, vehicle body parts and the like.

The finishing sheet is applied onto the substrate after being previously decorated on one side with the desired graphic design, which can merely consist of a uniform layer of paint.

The graphic design is then protected with a transparent film applied thereto.

An adhesive layer is then applied onto the finishing sheet on the side which is opposite to the decorated one, that is on the side that will adhere to the substrate.

The finishing sheet thus prepared is then applied to the substrate by thermo-vacuum forming.

An example of such a method is disclosed in U.S. Pat. No.5,125,994 which uses thermo-vacuum forming to make a thermoplastic film adhere to a substrate, said film having one painted side and the opposite side covered by adhesive.

A drawback of these methods consists in that the graphics applied to the side of the finishing sheet which is opposite to the side provided with the adhesive causes the graphics or paint itself to be subjected to atmospheric agents, possible scratches and other damages which can damage the substrate superficial finishing.

It is furthermore to be noted that the continuous exposition to the sun causes a fading of the paint applied to the finishing sheet so that, whenever it is needed to replace, for example in the case of a vehicle body part, a part thereof, the new replacement part will surely have a brighter color than the rest of the body part.

Furthermore, another drawback is that the graphic design or the paint is applied by spraying and thus the color control is a difficult operation and requires a particular cleaning of the spraying device, when using different colors, so as to avoid unwanted mixing of the various colors used, for example in the case of a complex graphic design.

Another drawback is that a skilled operator must intervene to carry out the whole method and also that such a method requires somewhat long execution times.

SUMMARY OF THE INVENTION

A principal aim of the present invention is thus to provide a method of applying a finishing sheet to a substrate, particularly for body parts of scooters, motorcycles and the like, which allows to obtain a substrate with durable chip resistant finishing.

Within this aim, an object of the present invention is to provide a method of applying a finishing sheet to a substrate which allows to obtain graphic designs or paintings with a variety of colors without mixing of the different colors.

Another object of the present invention is to provide a method of applying a finishing sheet to a substrate which can be carried out also by a relatively unskilled operator.

A further object of the present invention is to provide a method of applying a finishing sheet to a substrate which entails low volatile organic chemical emissions.

Another object of the present invention is to provide a method which is highly reliable, relatively easy to carry out and at competitive costs.

With this aim, these objects and others in view, which will become apparent hereinafter, there is provided, according to the present invention, a method of applying a finishing sheet to a substrate, particularly for body parts of scooters, motorcycles and the like, characterized in that it comprises the steps of:

printing a graphic design on that side of a transparent finishing sheet which has to face towards the substrate whereon it will be applied;

applying a film adhesive to the finishing sheet on the side of the sheet whereon the graphic design is printed;

applying the finishing sheet thus printed and with the adhesive film thereon, to the substrate by thermo-vacuum forming; and trimming the finishing sheet thus thermoformed along the perimeter of the substrate.

BRIEF DESCRIPTION OF THE DRAWINGS

Further characteristics and advantages of the present invention will become apparent from the following detailed description of a preferred but not exclusive embodiment thereof, illustrated only by way of non-limitative example in the accompanying drawings, wherein:

FIG. 1 shows a finishing sheet with a graphic design printed thereon, according to the present invention;

FIG. 2 shows a finishing sheet with a graphic design printed thereon and covered by adhesive, according to the present invention;

FIG. 3 shows a finishing sheet, according to the present invention, with a graphic design printed thereon and wherein the adhesive covers a portion of said sheet;

FIG. 4 shows a non-thermoformed finishing sheet, according to the present invention;

FIG. 5 shows a finishing sheet thermoformed on a substrate, according to the present invention.

DESCRIPTION OF THE PREFERRED EMBODIMENTS

With reference to the above figures, the method according to the invention comprises the following steps and the related execution procedures.

At first, the step for preparing a graphic design is carried out, said step consisting in converting a tridimensional graphic design into a corresponding two-dimensional design. The conversion from a tridimensional graphic design into a two-dimensional design 2 is realized in such a way that said two-dimensional graphic design 2 reproduces the same tridimensional initial design, once the applying method according to the invention is carried out.

This graphic design 2, converted into a two-dimensional one, will be applied onto a finishing sheet 1.

The graphic design 2 could be also a merely uniform color.

The finishing sheet 1, whereon the graphic design 2 will be printed, is advantageously formed by a near optical quality polyester film 0.020–0.060 inches (0.51–1.52 mm) thick, tailored to the substrate 4 to be coated and to the required finishing thickness.

The thickness of the finishing sheet material 1 is preferably controlled according to a very strict tolerance range: the variations in thickness must not exceed ±0.0016inches (0.041 mm) maximum.

The finishing sheet 1 is printed, onto the border sections which will not be occupied by the graphic design 2 to be applied to the sheet, with colors that absorb energy in the infrared spectrum at different rates. Accordingly, these border sections will heat up to different temperatures in the same period of time. In this way, temperature control sections 3 are created which allow to control the temperature directly within the finishing sheet 1, so as to control the amount of stretch of said sheet, the thickness of the sheet 1 on the substrate 4 it will be applied to and to avoid unwanted problems that can affect the sheet itself (such as the so called "webbing").

Subsequently, the graphic design 2, which can also consist of a uniform layer of paint, is printed onto the finishing sheet 1.

The printing process is a conventional silk screen printing process.

The ink or paint used in the silk screen printing process is properly chosen so as to withstand the following thermo-vacuum forming process which the finishing sheet 1 must undergo. The ink chemical composition is such that it bonds well to the finishing sheet 1, without rendering fragile said sheet 1.

Furthermore, the ink used must rewet during the next thermo-vacuum forming process and stretch together with the hot finishing sheet 1 whereon it is applied. Finally, it is important that the ink does not thin out to the point whereat the color changes or becomes translucent in the high stretch areas.

Conveniently, inks for example of the Gibraltar HV and High Impact series, and of the Color Mix HG and CX series, are employed.

The printing of the graphic design 2 is realized on that side of the finishing sheet 1 which is to be applied onto the substrate 4 and the graphic design is printed in reverse. The ink is spread onto the finishing sheet 1, color by color, in one or more coatings, the ink layers being designated, in FIGS. 4 and 5, by the reference numeral 5. The number of layers depends on the type of the graphic design 2, the colors used, and on the amount of stretch required for the thermo-vacuum forming of the finishing sheet 1 onto the substrate 4.

Conveniently, the ink layers 5 have a thickness in the range of 0.002–0.004 inches (0.051–0.102 mm).

The silk screen printing process is carried out in a climate controlled sterile room.

The next step consists in applying an adhesive film 6 to the finishing sheet 1.

Advantageously, as adhesive 6 a thermoplastic adhesive film 3M 941 or similar is used, which has a thickness of 0.0015–0.004 inches (0.040–0.102 mm). Such a thermoplastic film is a polyester resin based and provides a good adhesion to a variety of substrates 4.

A release coated protection paper liner is then applied into the surface of the adhesive film 6.

The adhesive film 6 is applied by lamination employing a roller laminator having a hot, and a cold rollers. The application temperature of the adhesive 6 is in the range of 85°–110°C. Advantageously, it has been found that the optimum temperature to carry out the lamination is between 200° and 220°F. (93°–104°C.).

The adhesive 6 is laminated to the finishing sheet 1 on the same side whereon the graphic design 2 is printed, i.e. on the side that is to be thermo-vacuum formed onto the substrate 4.

The adhesive film 6 must perfectly adhere to the finishing sheet 1, with no air bubbles, wrinkles, or other similar superficial defects.

Complete and definite bonding of the adhesive film 6 will be performed during the next thermo-vacuum forming step.

It is possible to apply the adhesive film 6 only to the portion of the finishing sheet 1 whereon the graphic design 2 is actually printed, with a small safety margin of adhesive 6 in excess beyond the edges of the graphic design 2.

Alternatively, it is possible to apply the adhesive film 6 as a strip wide enough to cover the graphic design 2 printed onto the finishing sheet 1, thus limiting adhesive film 6 buildup on the lamination rollers.

This adhesive 6 applying step is also carried out in a sterile room.

A protective film is applied to the finishing sheet 1, printed with the graphic design 2 and provided with the adhesive layer 6, onto the side which is opposite to the side whereon the graphic design 2 and the adhesive 6 are present. Such a film has the purpose of protecting the surface of the finishing sheet 1 from scratches or other damages caused by the stocking of the pre-printed finishing sheets 1 stacked one onto another.

The following step of the method according to the invention consists in thermo-vacuum forming the finishing sheet 1 to the substrate 4.

The substrate 4 can be made of plastics, fiberglass or metal.

The portion of the substrate 4, whereonto the pre-printed finishing sheet 1 must be thermoformed, must be inspected, cleaned and in some cases heated.

Subsequently, the substrate 4 is mounted onto the forming fixture in the forming machine. The forming machine is set up with such temperatures, in each area, as to ensure the correct forming of the finishing sheet 1 onto the substrate 4, with no air bubbles, the so-called "webbing" or other defects.

At this time, both the protective film and the release coated laminated liner are removed from the finishing sheet 1. The sheet 1 is mounted in the clamping frame of the forming machine and the frame is closed and latched.

Then the forming cycle starts with the finishing sheet 1 mounted in the clamping frame being heated. This heating has the effect of softening the finishing sheet 1, rewetting the ink layer(s) 5 and melting the adhesive 6. Obviously this adhesive melting does not damage the ink layers 5 whereonto the adhesive 6 is applied.

It has been found that the heating temperature should advantageously be within the range of 295°–305°F. (146°–152°C.).

After this heating, the clamping frame with the heated finishing sheet 1 inserted therein is moved into position over the substrate 4 to be coated and comes into contact with said substrate concurrently sucking air so as to create the vacuum, thus forming the softened finishing sheet 1 onto the substrate 4.

The substrate thus coated will have a smooth and uniform surface appearance with the finishing sheet 1 wrapped around the edges.

The vacuum is maintained until the finishing sheet 1, thermo-vacuum formed to the substrate 4, has cooled to the point whereat the adhesive film 6 has cured and bonded to the substrate 4.

Such a bonding is realized at a temperature of about 200° F. (93° C.).

At the end of the thermo-vacuum forming process, the substrate 4 thus coated is removed from the forming machine.

The following step consists in trimming and sealing the substrate 4 thus coated. To this end either manual trimming of the edges of the substrate 4 or an automated cutter/trimmer are used.

Certain detail areas of the substrate, which are difficult both to form and to trim, may have to be formed in a second forming step, separate from the previous vacuum forming step. For this purpose, a pneumatic or hydraulic pressure thermoforming machine is employed.

The sealing step, for example in the case of the edges surrounding a fuel filler tank cap, is carried out by using an appropriate fuel resistant sealing material.

Optionally, a chemical hardcoating can be applied to the substrate 4 thus coated, so as to increase the surface hardness of the formed substrate 4.

Advantageously, this chemical hardcoating can be a silicone based UV rays cured hardcoat produced by General Electric or similar.

This hardcoating step is carried out for those portions of the substrate 4 which require a surface hardness in the range of F to 6H (pencil test per ASTM D3363).

The chemical hardcoating can be applied either by dipping the coated substrate 4 into a chemical hardcoating material or by using a static controlled spraying equipment.

It has been practically noted that the method according to the invention fully achieves the intended aim since it allows to obtain a substrate decorated with any desired graphic design, or paint, having particular strength since the graphic design is laminated on that side of the finishing sheet of the substrate that faces towards the substrate, on the same side of the adhesive film.

The drawback of the prior art methods consisting in that the graphic design or paint is sprayed onto the side of the finishing sheet which faces outwards and is thus subjected to wear and possible damages is therefore eliminated.

Furthermore, a further advantage is the possibility of replacing, in the case of a vehicle body part, components thereof without difficulty in matching the color of replacement parts to that of original parts, since the color of the original parts will be subjected to less changes in time than the parts obtained by prior art methods, wherein the paint or graphic design is applied on the external side of the finishing sheet. Furthermore, the method according to the present invention makes it useless to apply a transparent protective film to the coated substrate, as it is instead necessary with prior art methods. All this causes, in addition to a simplification of the whole process, also a remarkable cost reduction.

The method thus conceived is susceptible to numerous modifications and variations, all of which are within the scope of the inventive concept.

Furthermore, all the details may be replaced with other technically equivalent ones.

In practice, the materials employed, as well as the shapes and dimensions, may be any according to the requirements without thereby abandoning the protective scope of the appended claims.

What is claimed is:

1. A method of applying a finishing sheet having a graphic design to a substrate comprising the steps of:
    printing a graphic design with ink on a side of a transparent finishing sheet which has to face towards a substrate whereon the finishing sheet with the graphic design will be applied;
    laminating a thermal activated film adhesive to the finishing sheet on the side of the sheet whereon the graphic design is printed;
    applying the finishing sheet thus printed and with the adhesive film thereon to the substrate by thermo-vacuum forming including heating the finishing sheet to soften the finishing sheet and to rewet the ink of the graphic design and to melt the adhesive film, and bringing the heated finishing sheet into contact with the substrate for stretching the finishing sheet and connecting the finishing sheet to the substrate.

2. A method according to claim 1, further including a step of trimming the thermoformed finishing sheet along a perimeter of the substrate, and wherein after said trimming step a sealing step of said finishing sheet along the perimeter of said substrate is carried out.

3. A method according to claim 2, wherein said trimming and sealing steps of said thus thermo-vacuum formed finishing sheet are carried out manually.

4. A method according to claim 2, wherein said trimming and sealing steps of said thus thermo-vacuum formed finishing sheet are carried out by an automated cutter-trimmer.

5. A method according to claim 1, wherein said finishing sheet is a polyester transparent finishing sheet.

6. A method according to claim 1, wherein said finishing sheet is printed, onto the areas not occupied by said graphic design, with colors adapted to absorb energy in the infrared spectrum at different rates, and to heat differently, said areas being adapted to realize a temperature control in order to control the final characteristics of said printed finishing sheet.

7. A method according to claim 1, wherein said printing of said graphic design onto said finishing sheet is performed by layering successive ink layers, one layer after another, one layer for each color, the number of said ink layers depending on the type of the graphic design.

8. A method according to claim 1, wherein said printing step of said finishing sheet is carried out in a climate controlled sterile room.

9. A method according to claim 1, wherein said step of laminating said adhesive film onto said substrate is carried out by heating said adhesive film.

10. A method according to claim 9, wherein said adhesive film lamination step is carried out at a temperature in the range of 85°–110° C.

11. A method according to claim 9, wherein said adhesive film lamination step is carried out at a temperature in the range of 200°–220° F. (93°–104° C.).

12. A method according to claim 1, wherein said adhesive film lamination step is carried out by means of a roller laminator in a sterile room.

13. A method according to claim 1, wherein said adhesive film is a polyester resin based adhesive.

14. A method according to claim 1, wherein a release coated paper liner is applied on a surface of said adhesive film not applied to the finishing sheet.

15. A method according to claim 14, wherein a protective film is applied to said finishing sheet on the side thereof which is opposite to the side whereonto said graphic design and said adhesive film are present.

16. A method according to claim 15, wherein said thermo-vacuum forming comprises the steps of:
    inspecting and cleaning said substrate;
    mounting said substrate onto a forming machine;
    setting the temperature of the forming machine so as to heat the various areas of said finishing sheet to be applied onto said substrate;
    removing said release coated paper liner from said adhesive film and removing said protective film;
    mounting said finishing film on a clamping frame of said forming machine then closing and latching said clamping frame;

heating said finishing sheet;

bringing said finishing sheet into contact with said substrate and applying the vacuum forming said finishing sheet onto said substrate;

cooling the substrate with the finishing sheet thermo-vacuum formed thereto;

removing from said forming machine the substrate.

17. A method according to claim 1, wherein said adhesive film is applied onto said finishing sheet substantially only to the area of said finishing sheet at which said graphic design is printed.

18. A method according to claim 1, wherein said adhesive film is applied onto said finishing sheet so as to cover a portion of said sheet which is wider than the portion actually printed with said graphic design.

19. A method according to claim 1, wherein said finishing sheet has a thickness in the range of 0.020–0.060 inches (0.51–1.52 mm).

20. A method according to claim 1, wherein said step for printing said graphic design onto said substrate is carried out by silk screen printing.

21. A method according to claim 1, further comprising a step of hardcoating said substrate.

22. A method according to claim 21, wherein said hardcoating step of said substrate is carried out by applying a chemical hardcoating material by dipping said substrate into said hardcoating material.

23. A method according to claim 22, wherein said chemical hardcoating is formed by a silicone based UV rays cured hardcoat.

24. A method according to claim 21, wherein said hardcoating step is carried out by static controlled spraying of a chemical hardcoating material.

25. A method according to claim 24, wherein said chemical hardcoating is formed by a silicone based UV rays cured hardcoat.

* * * * *